US010803127B2

(12) United States Patent
Alexander et al.

(10) Patent No.: US 10,803,127 B2
(45) Date of Patent: Oct. 13, 2020

(54) RELEVANT INFORMATION RETRIEVAL IN RECORD MANAGEMENT SYSTEMS

(71) Applicant: salesforce.com, inc., San Francisco, CA (US)

(72) Inventors: Zachary Alexander, Snoqualmie, WA (US); Siddharth Rajaram, Seattle, WA (US); Tracy Morgan Backes, Seattle, WA (US); Scott Thurston Rickard, Jr., Bellevue, WA (US)

(73) Assignee: salesforce.com, inc., San Francisco, CA (US)

( * ) Notice: Subject to any disclaimer, the term of this patent is extended or adjusted under 35 U.S.C. 154(b) by 278 days.

(21) Appl. No.: 15/601,806

(22) Filed: May 22, 2017

(65) Prior Publication Data

US 2017/0351781 A1    Dec. 7, 2017

Related U.S. Application Data

(60) Provisional application No. 62/346,364, filed on Jun. 6, 2016.

(51) Int. Cl.
*G06F 16/907* (2019.01)
*G06F 16/31* (2019.01)
(Continued)

(52) U.S. Cl.
CPC .......... *G06F 16/907* (2019.01); *G06F 16/313* (2019.01); *G06F 16/335* (2019.01);
(Continued)

(58) Field of Classification Search
CPC .. G06F 16/907; G06F 16/3347; G06F 16/313; G06F 16/335; G06F 16/3349; G06F 17/2785; G06N 3/02
See application file for complete search history.

(56) References Cited

U.S. PATENT DOCUMENTS

| 5,515,477 A | * | 5/1996 | Sutherland | ........... G06K 9/6232 706/41 |
| 2015/0293976 A1 | * | 10/2015 | Guo | ...................... G06F 16/248 707/706 |

(Continued)

*Primary Examiner* — Apu M Mofiz
*Assistant Examiner* — Husam Turki Samara
(74) *Attorney, Agent, or Firm* — Fenwick & West LLP

(57) ABSTRACT

A record management system retrieves relevance information through an information retrieval model that models relevance between users, queries, and records based on user interaction data with records. Relevance information between different elements of the record management system are determined through a set of learned transformations in the information retrieval model. The record management system can quickly retrieve relevance information between different elements of the record management system given the set of learned transformations in the information retrieval model, without the need to construct separate systems for different types of relevance information. Moreover, even without access to contents of records, the record management system can determine relevant records for a given query based on user interaction data and the determined relationships between users, queries, and records learned through the information retrieval model.

24 Claims, 11 Drawing Sheets

(51) Int. Cl.
  *G06F 16/335* (2019.01)
  *G06F 16/33* (2019.01)
  *G06N 3/08* (2006.01)
  *G06N 3/04* (2006.01)
  *G06F 40/30* (2020.01)

(52) U.S. Cl.
  CPC ...... *G06F 16/3347* (2019.01); *G06F 16/3349* (2019.01); *G06F 40/30* (2020.01); *G06N 3/0454* (2013.01); *G06N 3/08* (2013.01)

(56) References Cited

U.S. PATENT DOCUMENTS

2016/0343366 A1* 11/2016 Fructuoso ............... G10L 13/08
2019/0294967 A1*  9/2019 Kumar ................... G06N 3/082

* cited by examiner

RELEVANT INFORMATION RETRIEVAL IN RECORD MANAGEMENT SYSTEMS

CROSS-REFERENCE TO RELATED APPLICATION

This application claims the benefit of U.S. Provisional Application 62/346,364, filed Jun. 6, 2016, which is hereby incorporated by reference in its entirety.

BACKGROUND

Field of Art

The disclosure relates in general to retrieving information, and more specifically to retrieving relevant information in record management systems.

Description of the Related Art

Members of organizations (e.g., businesses, enterprises, and universities) generate and store electronic records on local or remote databases. Typically, members interact with a record management system to submit queries and retrieve relevant records. For example, members may submit a search query "Seattle Client Phone Numbers" requesting retrieval of records within the organization that contain phone numbers of clients located in Seattle.

Often times, record management systems retrieve relevant information by examining contents of electronic records and determining whether each record is relevant to a search query based on the contents of the record. However, in many cases, a record management system may not have access to contents of records. For example, a software solution for a customer may not have access to contents of the customer's records due to set policies of the customer. In such cases, it is difficult for the record management system to determine relevance information without access to content.

It is also desirable for record management systems to determine relevance for other combinations of users, queries, and records. For example, when a user has identified a relevant record to a submitted query, it may be advantageous for the record management system to provide the user with other records relevant to that record that are not returned with the query. As another example, it may be advantageous for the record management system to provide a user with other users of the system that share similar interests in records.

However, determining relevance between various elements of the record management system may be computationally burdensome, as often times the record management system may need to construct multiple systems depending on the type of relevance information. For example, the record management system may construct a system for determining relevant records to queries, and another system for determining similar records. Constructing multiple systems for retrieving relevance information may be computationally inefficient and time-consuming.

SUMMARY

A record management system retrieves relevance information through an information retrieval model that models relevance between users, queries, and records based on user interaction data with records. User interaction data may include previous queries submitted by users, and records the users interacted with based on the results of the submitted queries.

Relevance information between different elements of the record management system are determined through a set of learned transformations in the information retrieval model. For example, one set of transformations may be applied to a given query to determine relevant records for the query, while another set of transformations may be applied to a record to determine other records relevant to that record. As yet another example, one set of transformations may be applied to a user to determine other users similar to that user, while another set of transformations may be applied to a record to determine queries that are relevant to the record.

The record management system can quickly retrieve relevance information between different elements of the record management system given the set of learned transformations in the information retrieval model, without the need to construct separate systems for different types of relevance information. Moreover, even without access to contents of records, the record management system can determine relevant records for a given query based on user interaction data and the determined relationships between users, queries, and records learned through the information retrieval model.

In one embodiment, the information retrieval model is a neural network model with multiple layers of nodes, in which values at nodes of a current layer are a transformation of values at nodes of a previous layer. The transformation is determined through a set of weights connecting the current layer and the previous layer. In one embodiment, users, queries, and records are each represented by a layer of nodes in the information retrieval model, and relevance information between these elements can be retrieved by applying a set of transformations between the corresponding layers. For example, a layer of the model may represent queries, and a subsequent layer of the model may represent records. Relevant records to a query may be generated by applying the set of transformations between the query layer and the record layer to the query.

In one embodiment, the architecture of the information retrieval model has the property in which the input layer and the output layer correspond to the same element (e.g., user, queries, and/or records) of the record management system. This circular architecture provides different sets of transformations that relate different elements of the record management system together within the same model. For example, an information retrieval model may include a query input layer, a subsequent record layer, and a query output layer. The record management system can determine similar records to a particular record by applying the transformation between the record layer and the query output layer, and the transformation between the query input layer and the record layer to the particular record.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

Figure 1:
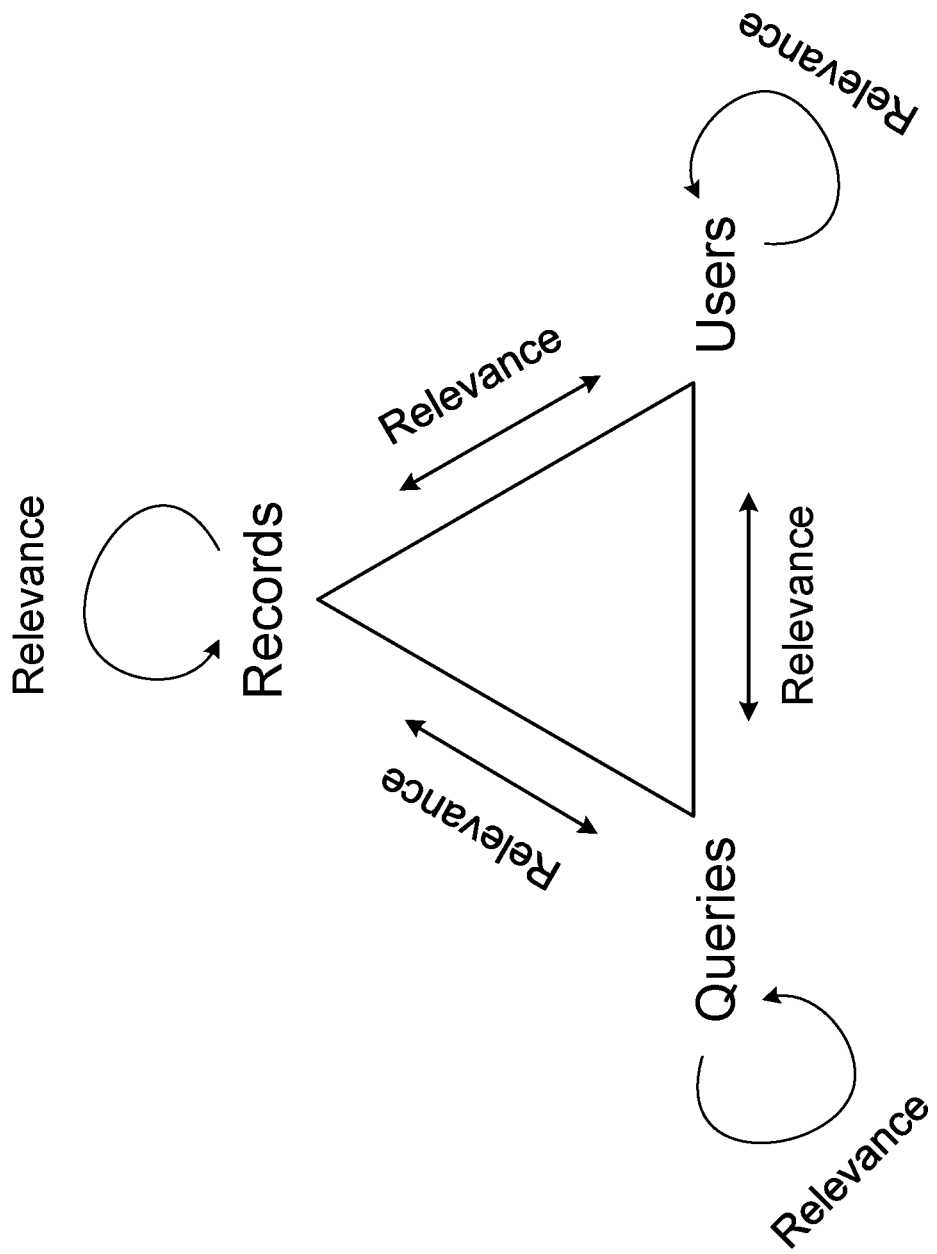
FIG. 1 is a high-level illustration of relevance between users, queries, and records of a record management system, in accordance with an embodiment.

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures.

The figures use like reference numerals to identify like elements. A letter after a reference numeral, such as "102a," indicates that the text refers specifically to the element having that particular reference numeral. A reference numeral in the text without a following letter, such as "102," refers to any or all of the elements in the figures bearing that reference numeral.

FIG. 1 is a high-level illustration of relevance between users, queries, and records of a record management system, in accordance with an embodiment. The record management system stores and manages records for an organization, such as businesses, universities, and the like. Users of the record management system may be members of the organization, such as employees of a business, students of a university, and the like. In one particular embodiment referred throughout the remainder of the specification, the administrator of the record management system is a business management entity, such as an enterprise resource planning (ERP) entity or customer relationship management (CRM) entity that allows businesses to manage inventory of sales, client relationships, product planning, workflow, and the like.

In one embodiment, the record management system receives search queries from users, and identifies and provides records that are relevant to the search queries. For example, a user may submit a search query "Seattle Client Phone Numbers" requesting retrieval of records within the organization that contain phone numbers of clients located in Seattle. Often times, record management systems retrieve relevant information by examining contents of electronic records and determining whether each record is relevant to a search query based on the contents of the record. For example, the record management system may analyze the content of a list of stored records, and identify records that include words identical or similar to "Seattle Client Phone Numbers."

However, in many cases, a record management system may not have access to contents of records. For example, the record management system may not have access to contents of a customer's records due to security policies of the customer. In such cases, it is difficult for the record management system to determine relevance information without access to record content.

As shown in FIG. 1, it is also desirable for record management systems to determine relevance between different combinations of users, queries, and records. For example, when a user has identified a relevant record to a submitted query, it may be advantageous for the record management system to provide the user with other records relevant to that record that are not necessarily returned with the query. As another example, the record management system may provide a user with other users of the system that share similar interests in records. As yet another example, the record management system can provide queries that are relevant to a given record.

However, determining relevance between various elements of the record management system (e.g., queries, users, and records) may be computationally burdensome, as often times the record management system may need to construct multiple systems depending on the type of relevance information. For example, the record management system may construct a system for determining relevant records to queries, and another system for determining similar records. Constructing multiple systems for retrieving relevance information may be computationally inefficient and time-consuming.

In one embodiment, the record management system retrieves relevance information through an information retrieval model that models relevance between users, queries, and records based on user interaction data with records. User interaction data may include previous queries submitted by users, and records the users interacted with based on the results of the submitted queries. Specifically, relevance information between different elements of the record management system can be determined by applying a set of learned transformations in the model based on the type of requested relevance information. For example, one set of transformations may be applied to a given query to determine relevant records for the query, while another set of transformations may be applied to a record to determine other records relevant to that record.

The record management system can quickly retrieve relevance information between different elements of the record management system given the set of learned transformations in the information retrieval model, without the need to construct separate systems for different types of relevance information. Moreover, the record management system can determine relevant records for a given query based on user interaction data and the relationships between users, queries, and records learned through the information retrieval model, even without access to record content.

Figure 2:
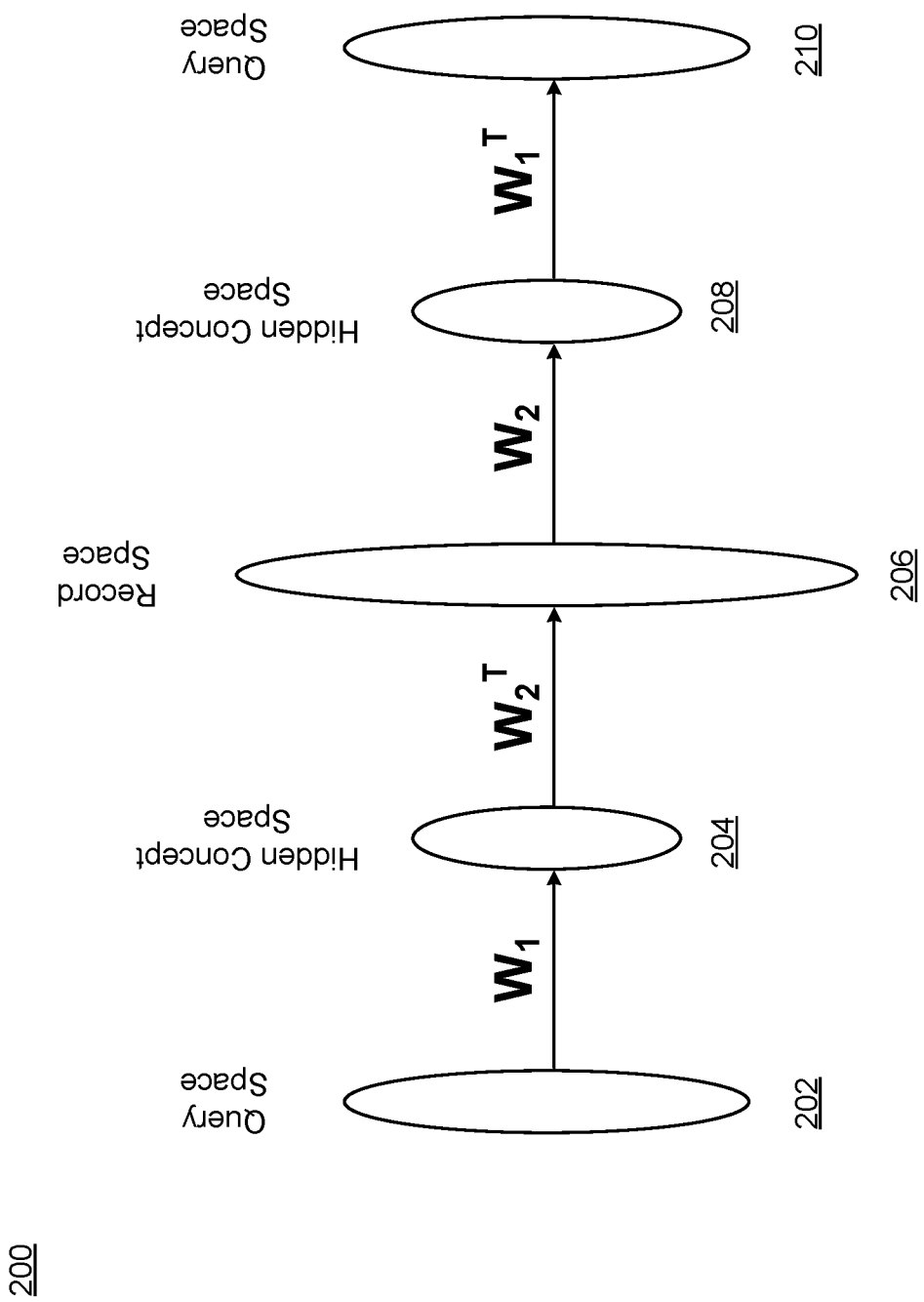
FIG. 2 is an information retrieval model based on queries and records, in accordance with an embodiment.

FIG. 2 is an information retrieval model 200 based on queries and records, in accordance with an embodiment. In one particular embodiment referred throughout the remainder of the specification, an information retrieval model is a neural network model with layers of nodes, in which values at nodes of a current layer are a transformation of values at nodes of a previous layer. The transformation is determined through a set of weights connecting the current layer and the previous layer. For example, as shown in FIG. 2, the example model 200 includes five layers of nodes: layers 202, 204, 206, 208, and 210. The transformation from layer 202 to layer 204 is given by $W_1$, the transformation from layer 204 to layer 206 is given by $W_2^T$, the transformation from layer 206 to layer 208 is given by $W_2$, and the transformation from layer 208 to layer 210 is given by $W_1^T$.

In one embodiment, users, queries, and records are each represented by one or more layers of nodes in the information retrieval model. Relevance information between these elements can be retrieved by applying a set of transformations between the corresponding layers. Continuing with the example from FIG. 2, layers 202 and 210 of the model 200 represent queries, and layer 206 of the model 200 represents records. Relevant records for a given query may be retrieved by applying the transformations $W_1$ and $W_2^T$ to the value of the query in the input space of layer 202. As another example, relevant queries for a given record may be retrieved by starting from a record in layer 206 of the model 200, and applying the transformations $W_2$ and $W_1^T$ to the value of the given record in the record space of layer 206. The set of weights indicate relationships between users, queries, and records, and are learned through historical user interaction data including search queries submitted by users and records users interacted with in response to receiving results of the search queries.

In one embodiment, the architecture of the information retrieval model has the property in which the input layer and the output layer correspond to the same element (e.g., user, queries, and/or records) of the record management system. This circular architecture allows the record management system to identify a set of transformations for retrieving relevance between any combination of elements represented in the information retrieval model. Returning to FIG. 2, in addition to identifying relevance information between records and queries, the record management system can also retrieve relevant records to a given record by starting from a record in layer 206, and applying the transformations $W_2$, $W_1^T$, $W_1$, and $W_2^T$ to the value of the record to generate a result that maps back to the record space in layer 206. The generated result are records that are related to the record that you originally started with in layer 206. As another example, if start in the model 200 with a query from layer 202 and apply transformations $W_1$ and $W_2^T$, records related to the query are identified. However, if continue through the model 200 and apply transformations $W_2$ and $W_1^T$, queries related to the starting query are identified.

The layers (e.g., layers 204 and 208 in the example model 200 of FIG. 2) in the information retrieval model other than those that correspond to users, queries, or records are known as hidden layers. For example, as shown in FIG. 2, layers 204 and 208 are hidden layers each placed between a query layer 202 or 210 and the record layer 206. Hidden layers are latent representations of different concepts, topics, roles, embeddings, and the like that are not observed in the data, but may govern the relationships between the elements of the record management system. For example, a node in the hidden layer may have strong connections (e.g., large weight values) to query values and record values that share the common topic of "contact information." As another example, another node in the hidden layer may have strong connections to query values and record values that share the common topic of "customer feedback." Specifically, in the example model of FIG. 2, nodes of the hidden layers 204 and 208 can link elements of the record management system that share common themes or topics together to help determine relevance between these elements.

In one embodiment, relevance information can also be retrieved for hidden layers by applying a set of appropriate transformations. For example, the record management system can retrieve relevant queries to a given node (e.g., representing a hidden concept) by starting from the hidden layer 202, and applying the transformations $W_2^T$, $W_2$, and $W_1^T$ to an indication of the node. The relevant queries may provide a description of the topics or concepts covered in the node. As another example, the record management system can retrieve relevant records to a given node by starting from the hidden layer 204, and applying the transformation $W_2^T$ to an indication of the node.

Figure 3:
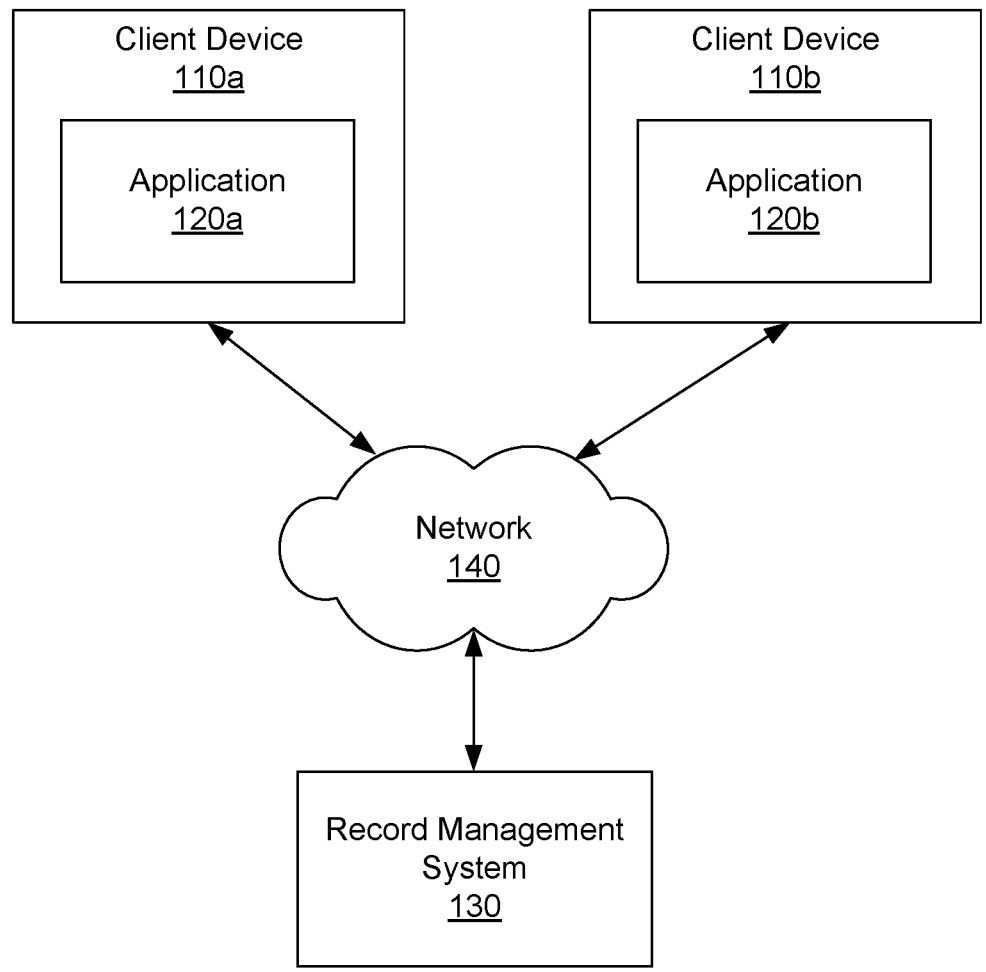
FIG. 3 is a high-level block diagram illustrating an embodiment of an environment for retrieving relevance information, in accordance with an embodiment.

FIG. 3 is a high-level block diagram illustrating an embodiment of an environment 300 for retrieving relevance information, in accordance with an embodiment. The environment includes one or more client devices 110 connected by a network 140 to a record management system 130. Here only two client devices 110a, 110b and one record management system 130 are illustrated but there may be multiple instances of each of these entities. For example, there may be thousands or millions of client devices 110 in communication with one or more record management systems 130.

The network 140 provides a communication infrastructure between the client devices 110 and the record management system 130. The network 140 is typically the Internet, but may be any network, including but not limited to a Local Area Network (LAN), a Metropolitan Area Network (MAN), a Wide Area Network (WAN), a mobile wired or wireless network, a private network, or a virtual private network. Portions of the network 140 may be provided by links using communications technologies including WiFi based on the IEEE 802.11 standard, the BLUETOOTH short range standard, and the Wireless Universal Serial Bus (USB) standard.

The client devices 110 are computing devices such as smartphones with an operating system such as ANDROID® or APPLE® IOS®, tablet computers, laptop computers, desktop computers, electronic stereos in automobiles or other vehicles, or any other type of network-enabled device on which digital content may be listened to or otherwise experienced. Typical client devices 110 include the hardware and software needed to connect to the network 118 (e.g., via Wifi and/or 4G or other wireless telecommunication standards).

The client device 110 includes an application 120 that allows a user of the client device 110 to interact with the record management system 130. For example, the application 120 could be a browser that allows a user of the client device 110 to interact with the record management system 130 by browsing a web site of the record management system 130. As another example, the application 120 could be a dedicated application specifically designed (e.g., by the organization responsible for the record management system 130) to enable interactions with the record management system 130 and its content. In one embodiment, the application 120 is a business management application, such as enterprise resource planning (ERP) application or customer relationship management (CRM) application that allows businesses to manage inventory of sales, client relationships, product planning, workflow, and the like.

Users of client devices 110 are members of organizations, such as businesses, universities, and the like. The application 120 of a client device 110 allows members of an organization to store electronic records and retrieve records from the record management system 130. In one embodiment, applications 120 of client devices 110 allow members of the organization to request various types of relevance information from the record management system 130. For example, members of the organization may submit search queries, and request records relevant to the submitted queries. As another example, a member of the organization may request from the record management system 130 information on other members that are similar to the user (e.g., in terms of the type of records that they retrieve from the system 130). As an additional example, users may obtain from the record management system 130 information on records that are related to an identified record.

The record management system 130 stores and manages records for an organization. The record management system 130 provides relevance information responsive to one or more requests from the client devices 110 by applying a set of transformations of an information retrieval model based on the type of requested information. In one embodiment, the record management system 130 trains an information retrieval model in which users, queries, and records are represented by one or more layers of nodes in the model, and in which the input and output layers correspond to the same element of the record management system 130.

Specifically, the record management system 130 may train the information retrieval model by collecting a training data set that includes queries submitted by users of the system 130, and a set of records the users interacted with responsive to receiving results of the submitted queries. Based on the training data, the record management system 130 determines values for the set of weights in the information retrieval model by training a series of different neural network models composed of layers of nodes corresponding to those included in the information retrieval model. In one embodiment, the record management module 130 encodes queries into embedding vectors by applying one or more embedding models to the queries.

Figure 4:
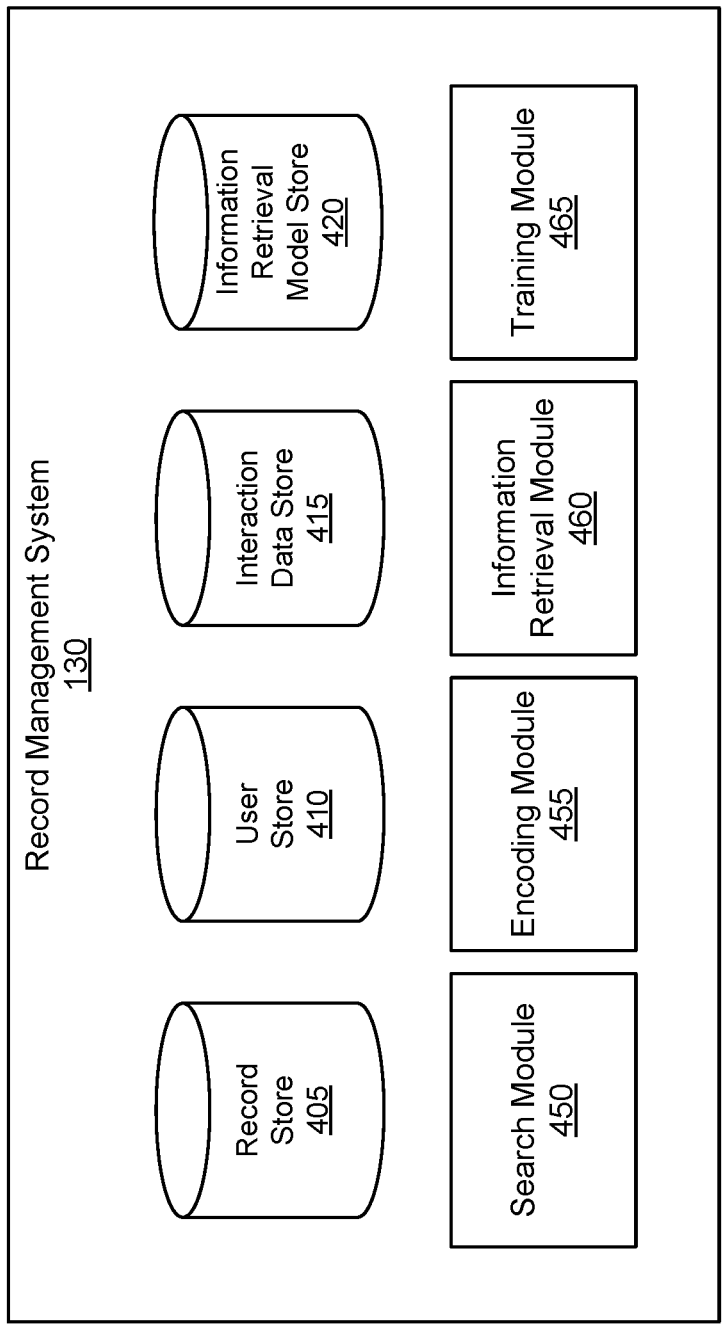
FIG. 4 is an example block diagram of an architecture of the record management system, in accordance with an embodiment.

FIG. 4 is an example block diagram of an architecture of the record management system 130, in accordance with an embodiment. The record management system 130 shown in FIG. 4 includes a search module 450, an encoding module 455, an information retrieval module 460, and a training module 465. The record management system 130 also includes record store 405, user store 410, interaction data 415, and information retrieval model store 420. In other embodiments, the record management system 130 may include additional, fewer, or different components for various applications. Conventional components such as network interfaces, security functions, load balancers, failover servers, management and network operation consoles, and the like are not shown so as to not obscure the details of the system architecture.

The record store 405 stores electronic records that are generated by members of an organization. The information included in electronic records may vary. For example, records may be text-based records such as letters, reports, memos, word processing documents, and e-mail messages. Common formats for text-based records may include Portable Document Format (PDF), Rich Text Format (RTF), textfile (TXT), and Microsoft Word Binary File Format (DOC), and the like. Example records may also be graphics-based records that contain illustrations, photographs, and web-page graphics. Common formats for graphics-based records may include Encapsulated Postscript (EPS), Tagged Image File Format (TIFF), JPEG, Portable Network Graphics (PNG), Graphics Interchange Format (GIF), and the like. Example records may also be audio and video-based records that contain videos, music files, and recorded narratives. Common formats for audio and video-based records may include QuickTime File Format (MOV), Moving Picture Experts Group (MPEG), Windows Media Video (WMV), MPEG-1 and/or MPEG-2 Audio Layer (MP3), and the like. Example records may also be spreadsheet-based records that contain financial analyses and statistical calculations. Common formats for spreadsheet-based records may include Excel Binary File Format (XLS) and the like. However, it is appreciated that electronic records may include any other electronic file of any format that can be stored on a database other than those described here.

The electronic records stored in the record store 405 are selectively accessible to members of the organization. Each electronic record is assigned a record ID and is associated with a set of metadata. The record ID is an identifier unique to an electronic record. An example record ID may be "00100013OeF." The set of metadata describes various properties of the record and may include fields such as title of the record, memory size, time and date created, creator, last time edited, format and extension, and the like of the record.

The user store 410 contains information on users of the record management system 130. Each user in the user store 410 is assigned a user ID and is associated with a set of metadata. The user ID is an identifier unique to a user. An example user ID may be "0050001vOAm." The set of metadata describes various information of the user and may include fields such as name, age, birthdate, which unit or groups of the organization the member is affiliated with, and rank and role of the member in the organization hierarchy, and the like.

The search module 450 receives search queries for records from users and returns to the requesting client devices 110 records that are relevant to the search queries. A search query is a string of text entered by a user to identify records in the record store 405 that satisfy various information needs of the user. In one embodiment, when a search query is received from a client device 110, the search module 450 provides the search query to the information retrieval module 460. The search module 450 indicates to the information retrieval module 460 that the provided information is a search query and requests an output of records that are relevant to the search query. The search module 450 receives from the information retrieval module 460 a list of records identified using an information retrieval model that are relevant to the search query. In one embodiment, the search module 450 filters the list to remove records that are not accessible by the user that entered the search query. The remaining records are transmitted as search results to the client device 110 that provided the search query.

The interaction data store 415 stores user interaction data that indicates user interactions with records in the record store 405 responsive to submitting search queries. Specifically, each instance in the interaction data store 415 may indicate a search query, the user who submitted the search query, and a list of records the user interacted with responsive to receiving the search results. For example, an example instance may be "query: 'Seattle Sales Manager Contact Information,' user ID: 0050001vOAm, interacted records: 00100013OeF, 00100017JeE, 00100024WmH." In one embodiment, for a search query instance, the interaction data store 415 includes information on records in the interaction data store 415 that users interacted with to retrieve content of the records. For example, these may include records that users clicked on to access the record, records that users requested to see previews of, records that users saved onto a local device, and the like. Records in the interaction data store 415 thus represent those records that were relevant to the submitted search queries as determined by users of the record management system 130.

The encoding module 455 encodes queries, users, and records, including those included in the interaction data store 415. Specifically, an information retrieval model is trained based on the encoded data in the interaction data store 415. In one embodiment, the encoded query vector $q_i$ of data instance i represents a word embedding of the corresponding query, and is generated by applying one or more embedding models that map the query string to the word embedding $q_i$ of the query. Specifically, the embedding models map the query string to a vector space, where each query string is mapped to a unique vector. Query strings that have similar contexts are mapped in close proximity in the vector space. In one embodiment, the query vector $q_i$ are generated by embedding models such as word2vec, doc2vec, and the like.

In one embodiment, the user vector $u_i$ of the query for data instance i is represented by a one-hot encoded vector that represents a list of users of the record management system 130, in which only the element corresponding to the user of the query $q_i$ has a non-zero value. Specifically, the user vector $u_i$ may have dimensionality corresponding to the number of users of the record management system 130 for the organization, and each element may represent a unique user of the system 130. In one embodiment, the encoding module 455 assigns the element corresponding to the user of the query $q_i$ a value of 1, and 0 for the remaining elements. For example, user vector $u_i$ for user ID: 0050001vOAm among a group of 5 users may be represented as "[0 0 1 0 0]" where the third element corresponds to user ID: 0050001vOAm.

In one embodiment, the record vector $r_i$ of the query for data instance i is represented by a one-hot encoded vector that represents a list of records stored in the record management system 130, in which only the elements corresponding to records that were interacted with have a non-zero value. Specifically, the record vector $r_i$ may have dimensionality corresponding to the number of records of the record management system 130 for the organization, and each element may represent a unique record of the system 130. In one embodiment, the encoding module 455 assigns the elements corresponding to records that were interacted with values of 1, and 0 for the remaining elements. For example, record vector $r_i$ for record IDs: 00100013OeF, 00200015FmJ among a list of 4 records may be represented as "[0 0 1 1]" where the third and fourth elements correspond to record IDs: 00100013OeF, 00200015FmJ.

The encoding module 455 also encodes inputs to the information retrieval model for which relevance information is unknown. When the input is a query, the encoding module 455 encodes the input into a query input vector $q_h$ as an embedding mapping of the query of interest in the embedding vector space. When the input is a record, the encoding module 455 encodes the input into a record input vector $r_h$ as a one-hot encoded vector having non-zero values at elements corresponding to the records of interest. When the input is a user, the encoding module 455 encodes the input into a user input vector $u_h$ as a one-hot encoded vector having non-zero values at elements corresponding to the users of interest. When the input is reference to a hidden node, the concept input vector $c_h$ is a one-hot encoded vector having non-zero values at elements corresponding to the hidden node of interest.

The information retrieval module 460 retrieves relevance information using one or more information retrieval models stored in the information retrieval model store 420. The information retrieval module 460 receives a request, for a given input of a first element (e.g., records, users, queries) to retrieve relevance outputs of a second element (e.g., records, users, queries) relevant to the input. As previously described in conjunction with the example architecture 200 shown in FIG. 2, each element type is associated with a set of nodes in one or more layers of the information retrieval model. The information retrieval module 460 identifies a first set of nodes (i.e., a first layer of the model) associated with the element type of the input, and a second set of nodes (i.e., a second layer of the model) associated with the element type of the requested output. The information retrieval module 460 also identifies a sequence of transformations that connect the first set of nodes to the second set of nodes in the information retrieval model. The information retrieval module 460 applies the sequence of transformations of the model to the input to generate a corresponding output. The relevant outputs are determined based on the generated output.

The information retrieval module 460 determines an input vector that is an encoded version of the input. In one embodiment, the information retrieval module 460 requests the encoded input from the encoding module 455 in the form of a query input vector, a record input vector, a user input vector, or a concept input vector. In one instance, the set of nodes representing a element type has the same dimensionality as the encoded input vectors for the element type. For example, a set of nodes representing the query space may have the same dimensionality as a query input vector $q_h$. The information retrieval module 460 provides the input vector to a set of nodes associated with the element type of the input. In one instance, when the layer associated with the input element type includes multiple sets of nodes representing different element types, the information retrieval module 460 provides the input vector in a concatenated form, in which the input vector is concatenated with a number of zeros corresponding to the other sets of nodes.

Each transformation between two layers of the information retrieval model is characterized as a matrix multiplication operation. Specifically, when values at nodes of a layer are represented as a vector, the output at the next layer is generated by matrix multiplying the values at the previous layer with the corresponding matrix of weights connecting the two layers. Mathematically, a given vector $z_j$ at layer j of the information retrieval model may be generated by the transformation:

$$z_j = f_j(W_j \cdot z_{j-1})$$

where $z_{j-1}$ is a vector at the previous layer j−1, $W_j$ is the matrix of learned weights connecting layer j−1 to layer j, and $f_j(\cdot)$ is an activation function associated with layer j.

In one embodiment, a transformation from a set of nodes of a first element type to a set of nodes of a second element type is characterized by a matrix that is a transpose of a matrix for a transformation from a set of nodes of the second element type to a set of nodes of the first element type. For example, as shown in FIG. 2, the transformation from hidden concept space 204 to record space 206 is given by $W_2^T$, while the transformation from record space 206 to hidden concept space 208 is given by $W_2$.

The information retrieval module 460 applies a sequence of matrix multiplications to the encoded input vector corresponding to the sequence of identified transformations. In other words, the input vector provided at the input layer is propagated through a sequence of transformations until an output is generated at a layer associated with the element type of the requested output. Specifically, an output vector at nodes representing queries may be referred to as a query output vector $q'_h$, an output vector at nodes representing records may be referred to as a record output vector $r'_h$, an output vector at nodes representing users may be referred to as a user output vector $u'_h$, and an output vector at nodes representing hidden concepts may be referred to as a concept output vector $c'_h$. The information retrieval module 460 determines relevant outputs based on the generated output vectors.

Returning to the example in FIG. 2, the record output vector at layer 206 generated based on a given query input at layer 202 may be expressed as:

$$r'_h = f_3(W_2^T \cdot f_2(W_1 \cdot q_h)).$$

As another example, the query output vector at layer 210 generated based on a given record input at layer 206 may be expressed as:

$$q'_h = f_5(W_1^T \cdot f_4(W_2 \cdot r_h)).$$

As yet another example, the record output vector at layer 206 generated based on a given record input at layer 206 may be generated by:

$$r'_h = f_2(W_2^T \cdot f_1(W_1 \cdot f_5(W_1^T \cdot f_4(W_2 \cdot r_h))))).$$

As yet another example, the concept output vector at layer 204 generated based on a given hidden concept input at layer 204 may be generated by:

$$r'_h = f_2(W_1 \cdot f_5(W_1^T \cdot f_4(W_2 \cdot f_3(W_2^T \cdot c_h))))).$$

A query output vector $q'_h$ in a layer representing query space indicates a point in the word embedding vector space. In one embodiment, the information retrieval module 460 retrieves relevant query outputs by identifying neighboring queries that correspond to word embedding vectors within a predetermined distance from the query output vector $q'_h$. As an example, the neighboring queries for a given query output vector $q'_h$ may include similar queries generally related to contact information, such as "Seattle Contacts, San Francisco Contacts, Sales Phone Numbers, Seattle Phone Numbers," and the like.

A record output vector $r'_h$ in a layer representing record space indicates relevance likelihoods of each record in the record management system 130 to the given input. In one embodiment, the information retrieval module 460 retrieves relevant records by identifying records corresponding to elements in the record output vector $r'_h$ that have a value above a predetermined threshold. As an example, the information retrieval module 460 may identify relevant records as record IDs: 00100035WmF, 00200015FmJ, corresponding to first and third elements in the record output vector [0.92 0.36 0.84 0.23] that have a value above a threshold of 0.75.

A user output vector $u'_h$ in a layer representing user space indicates relevance likelihoods of each user in the record management system 130 to the given input. In one embodiment, the information retrieval module 460 retrieves relevant users by identifying users corresponding to elements that have a value above a predetermined threshold in the user output vector $u'_h$. As an example, the information retrieval module 460 may identify relevant users as user IDs: 00300012BfI, 00100017MmR, corresponding to first and second elements that have a value above a threshold of 0.75 in the user output vector [0.95 0.78 0.36 0.12].

A concept output vector $c'_h$ in a layer representing hidden concept space indicates relevance likelihoods of each node to the given input. In one embodiment, the information retrieval module 460 retrieves relevant hidden nodes by identifying nodes corresponding to elements in the concept output vector $c'_h$ that have a value above a predetermined threshold. As an example, the information retrieval module 460 may identify relevant first and second nodes corresponding to first and second elements in the concept output vector [0.95 0.78 0.36 0.12] that have a value above a threshold of 0.75.

Figure 5:
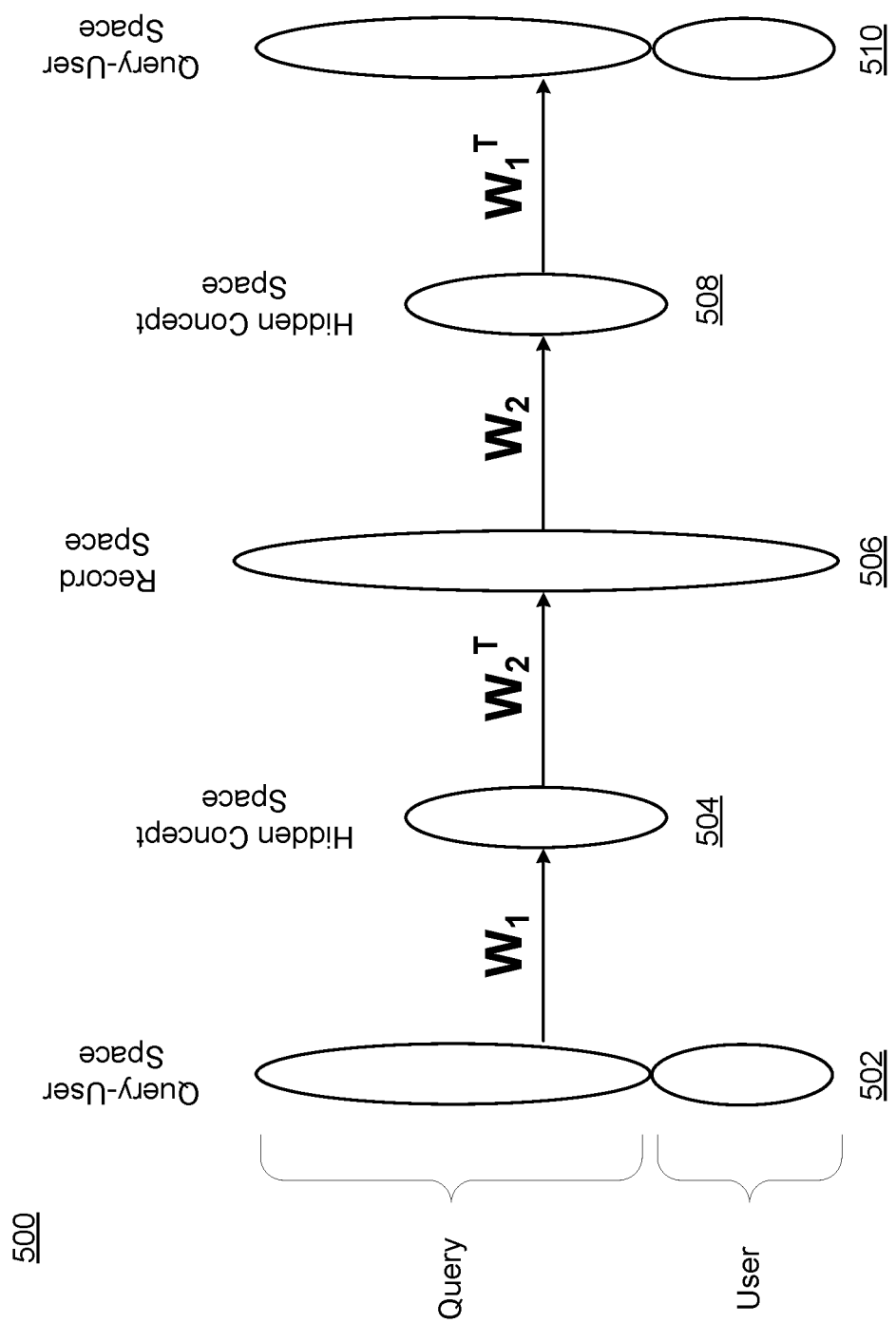
FIG. 5 is an example architecture of an information retrieval model based on queries, records, and users, in accordance with an embodiment.

In one embodiment, the information retrieval model resembles the model 200 shown in FIG. 2, which can be used to retrieve relevance information between queries and records. In another embodiment, the information retrieval model resembles the model 500 shown in FIG. 5, which can be used to retrieve relevance information between queries, records, and users. The information retrieval model 500 shown in FIG. 5 is similar to the information retrieval model 200 of FIG. 2 in that it includes five layers: layers 502, 504, 506, 508 and 508. Layers 504 and 508 are hidden layers and layer 506 is a record layer. However, the information retrieval model 500 shown in FIG. 5 is distinct from model 200 in FIG. 2 because it includes a query-user space at layers 502 and 510 to account for user relevant information as well as query relevant information. For example, a set of nodes representing queries and a set of nodes representing users are concatenated together in layers 502 and 510.

Figure 6:
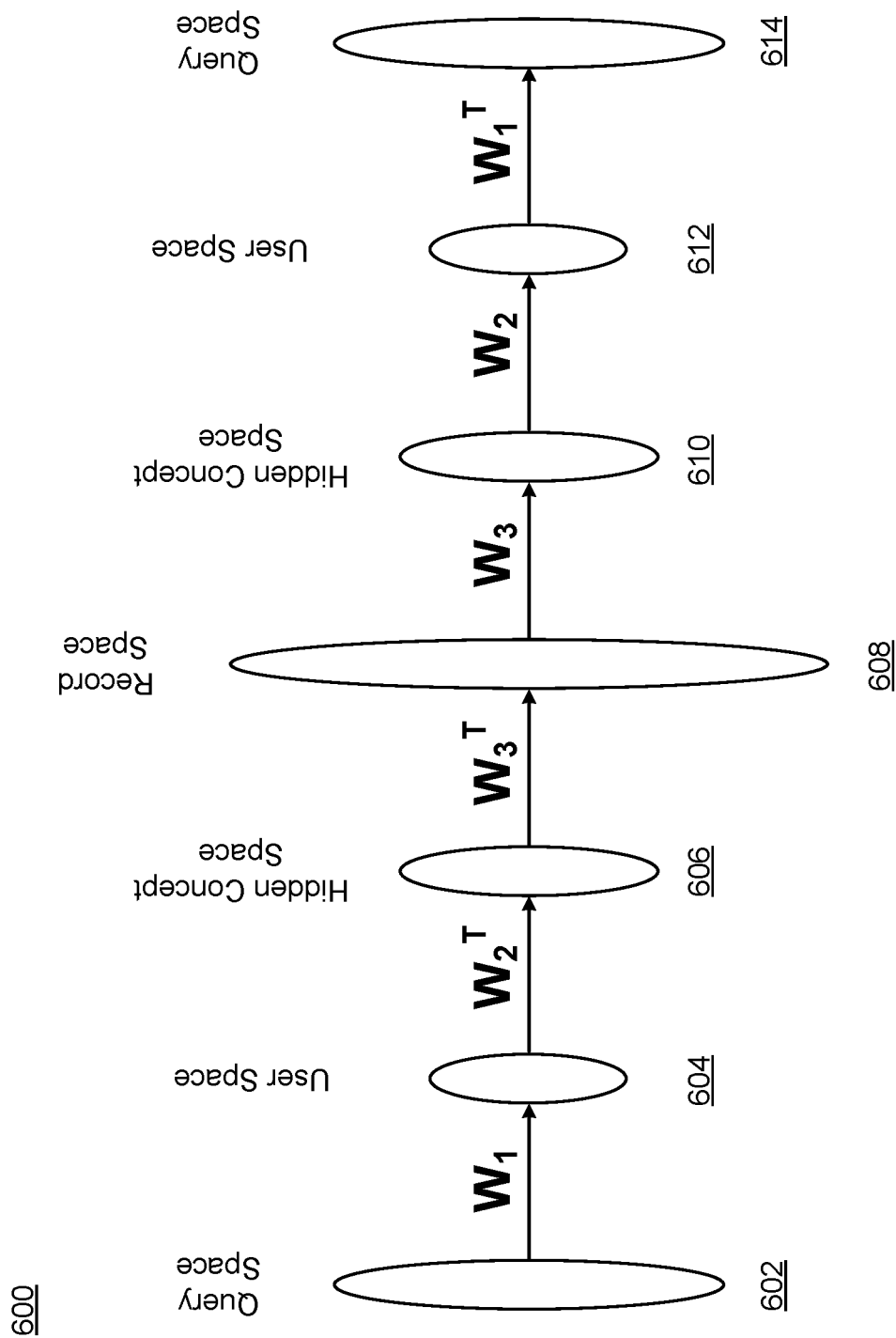
FIG. 6 is an information retrieval model based on queries, records, and users, in accordance with another embodiment.

In another embodiment, the information retrieval model resembles the model 600 shown in FIG. 6, which can also be used to retrieve relevance information between queries, records, and users. Specifically, the information retrieval model 600 shown in FIG. 6 is distinct from 200 in FIG. 2 because it includes seven layers (layers 602, 604, 606, 608, 610, 612, and 614) instead of five layers. Layers 604 and 612 are the added layers that represent users. The transformation from query layer 602 to user layer 604 is given by $W_1$, the transformation from user layer 604 to hidden layer 606 is given by $W_2^T$, the transformation from hidden layer 606 to record layer 608 is given by $W_3^T$, the transformation from record layer 608 to hidden layer 610 is given by $W_3$, the transformation from hidden layer 610 to user layer 612 is given by $W_2$, and the transformation from user layer 612 to query layer 614 is given by $W_1^T$.

The models 200, 500, and 600 shown in FIGS. 2, 5, and 6 are merely illustrative, and it is appreciated that in other instances, the architecture of the information retrieval model may be modified as needed. For example, the user layer may be placed between the layers representing hidden concept space and layers representing record space.

Returning to FIG. 4, the training module 465 trains information retrieval models stored in the information retrieval model store 420. In the following, the embodiments are described primarily with reference to the example architecture of the information retrieval model shown in FIG. 2, merely to facilitate explanation and understanding of the training module 465. However, it is appreciated that, in other embodiments, the concepts described below can be extended to information retrieval models of other architectures.

The training module 465 trains one or more information retrieval models based on a set of encoded user interaction data 415. Specifically, during the training process, the training module 465 determines the weights for the information retrieval model. In one embodiment, the training module 465 trains the information retrieval model based on a series of multiple training steps, in which each step adjusts the values for weights of the information retrieval model based on a set of different training neural network architectures that do not necessarily correspond to the architecture of the information retrieval model.

Typically, in conventional neural network models, the input is fed into the first layer of the model and the output is generated by propagating the input through the neural network model based on the set of weights for the model. Specifically, given existing data including known values of inputs and outputs, a single training process determines the set of weights through an iterative process that reduces the difference between the known outputs and estimated outputs generated by propagating the input through the network. In contrast to typical neural network models, the training module 465 performs a series of multiple training steps because the architecture of the information retrieval model allow different layers of the model to function as both input and output layers. As an example, the record layer can function as an output layer but is placed in the middle of the information retrieval model shown in FIG. 2, in contrast to typical neural network models.

In each training step, the training module 465 adjusts values for weights of the information retrieval model to minimize or reduce a loss function between a set of known target data and outputs generated by propagating a corresponding input at the first layer through the network. Specifically, the loss function indicates difference between the target data and the generated outputs, and minimizing the loss function aims to generate outputs that resemble target data. For each training network model, the weights connecting layers for different elements correspond to those in the information retrieval model. For example, a set of weights connecting the hidden concept layer to the record layer in a training network model correspond to the same weights used in the information retrieval model.

The loss function is typically determined across multiple data instances i∈S in a subset of user interaction data 415. In one embodiment, the loss function can be expressed as:

$$\ell(y_{i \in S}, f(x_{i \in S})) = -\frac{1}{|S|} \sum_{i \in S} y_i \cdot \ln f(x_i) + (1 - y_i) \cdot (1 - f(x_i))$$

where $x_i$ denotes a known input vector from data instance i, $y_i$ denotes a corresponding target vector from data instance i, and $f(x_i)$ is the output vector generated at a set of nodes in the last layer by propagating the input $x_i$ through the current set of weight estimates. In another embodiment, the loss function can be expressed as:

$$\ell(y_{i \in S}, f(x_{i \in S})) = \sum_{i \in S} 1 - y_i \cdot f(x_i)$$

However, it is appreciated that other forms of loss functions can be used in addition to those described above.

In the first training step, the training module 465 determines weight estimates using a first training network that includes an input layer and an output layer having same dimensionality, and corresponding to the same type of elements. The first training network also includes a layer representing the hidden concept space in between the input layer and the output layer. The training module 465 determines weight estimates such that the loss function between an input at the first layer of the first training network and an output generated at the last layer based on the same input is minimized. Thus, the input vector acts as the target vector. In one embodiment, when the input and output layers contain different types of data, the training module 465 determines the weight estimates through an iterative process by minimizing loss functions each associated with different element types.

Figure 7A:
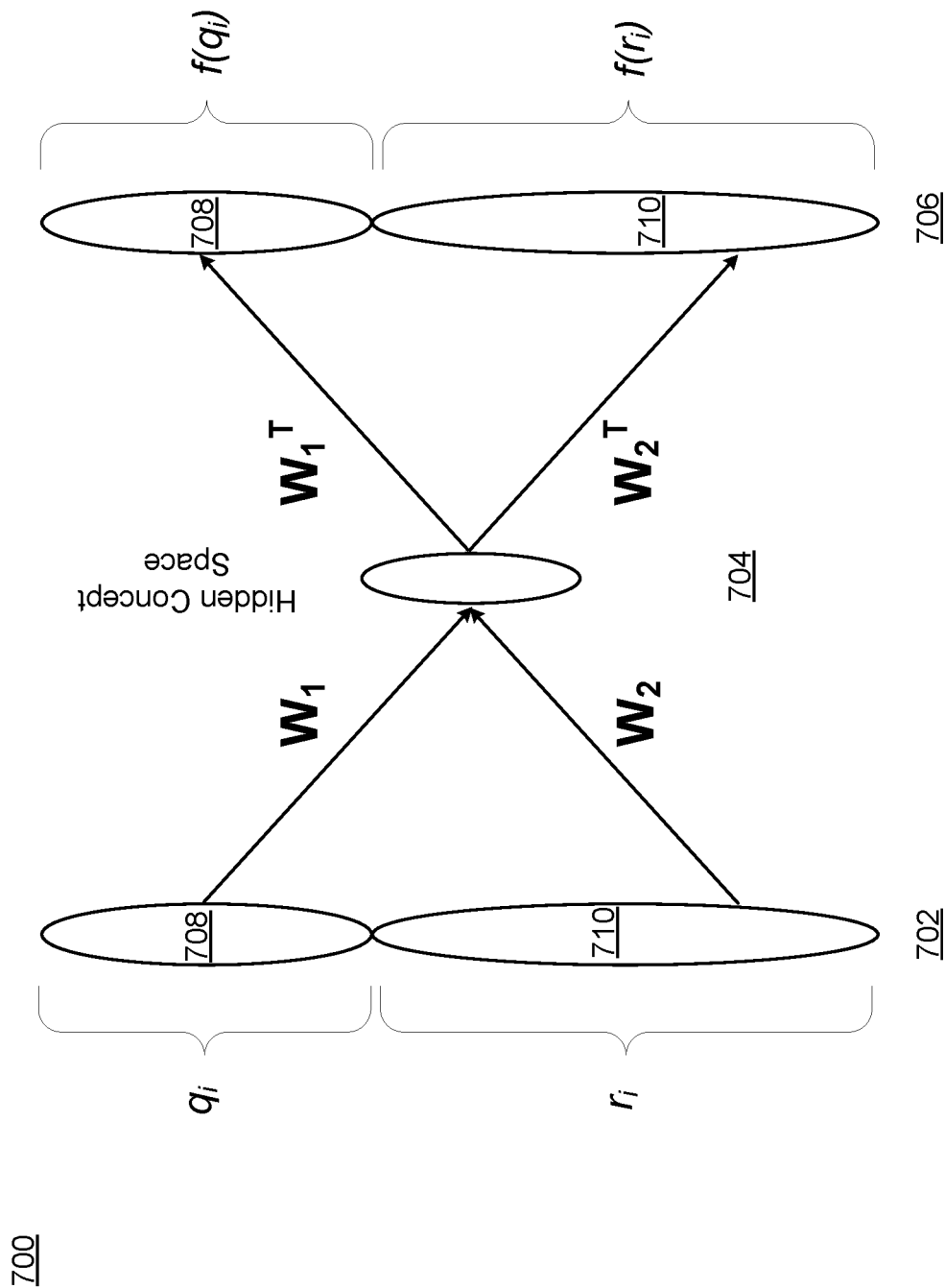
FIG. 7A illustrates an example training network architecture, in accordance with an embodiment.

FIG. 7A illustrates an example training network architecture, in accordance with an embodiment. As shown in the training network 700 of FIG. 7A, a set of top nodes 708 in input layer 702 and output layer 706 correspond to queries and a set of bottom nodes 710 in the input layer 702 and the output layer 706 correspond to records. Hidden concept layer 704 is placed between the input layer 702 and the output layer 706. The weights $W_1$, $W_1^T$ that connect nodes in the hidden concept space 704 to the set of query nodes 708 correspond to those between layers 202 and 204, and between layers 208 and 210 in the information retrieval model 200 shown in FIG. 2. Similarly, the weights $W_2$, $W_2^T$ that connect nodes in the hidden concept space to the set of record nodes correspond to those between layers 204 and 206, and between layers 206 and 210 in the information retrieval model 200 shown in FIG. 2.

A query loss function is generated based on a set of query vectors, and a record loss function is generated based on a set of record vectors from user interaction data stored in the interaction data store 415. The query loss function may be given by:

$$l_{q,1}(q_{i \in s_1}, f(q_{i \in s_1})),$$

where $q_i$ is the query vector from data instance i, and $S_1$ is the subset of encoded data used for the first training step. The record loss function may be given by:

$$l_{r,1}(r_{i \in s_1}, f(r_{i \in s_1})),$$

where $r_i$ is the query vector from data instance i. The output at the set of nodes for queries is generated by:

$$f(q_i) = f_3(W_1^T \cdot f_2(W_1 \cdot q_i + W_2 \cdot r_i)),$$

and the output at the set of nodes for records is generated by:

$$f(r_i) = f_5(W_2^T \cdot f_2(W_1 \cdot q_i + W_2 \cdot r_i)),$$

where $f_2$ is the activation function associated with the hidden concept layer, and $f_5$ is the activation function associated with the query layer in the architecture of FIG. 2.

In one embodiment, the training module 465 at each iteration, adjusts values of the weights based on a sum of the query loss and the record loss. In another embodiment, the training module 465, alternatively for each iteration, adjusts the values of weights based on the query loss or the record loss.

In the second training step, the training module 465 determines weight estimates using a pair of second training networks that each include an input layer and an output layer corresponding to different types of data. Specifically, the order arrangement of layers in one of the second training networks is the reverse of the arrangement of layers in the other. Each of the second training networks include a layer representing the hidden concept space in between the corresponding input layer and the output layer. In one embodiment, the training module 465 determines the weight estimates through an iterative process by minimizing loss functions each associated with a corresponding second training network in the pair. Specifically, each loss function may indicate discrepancies between a target vector associated with the output layer of a second training network, and an output generated based on a corresponding input. The initial estimates for the weights may be values determined from the first training step.

Figure 7B:
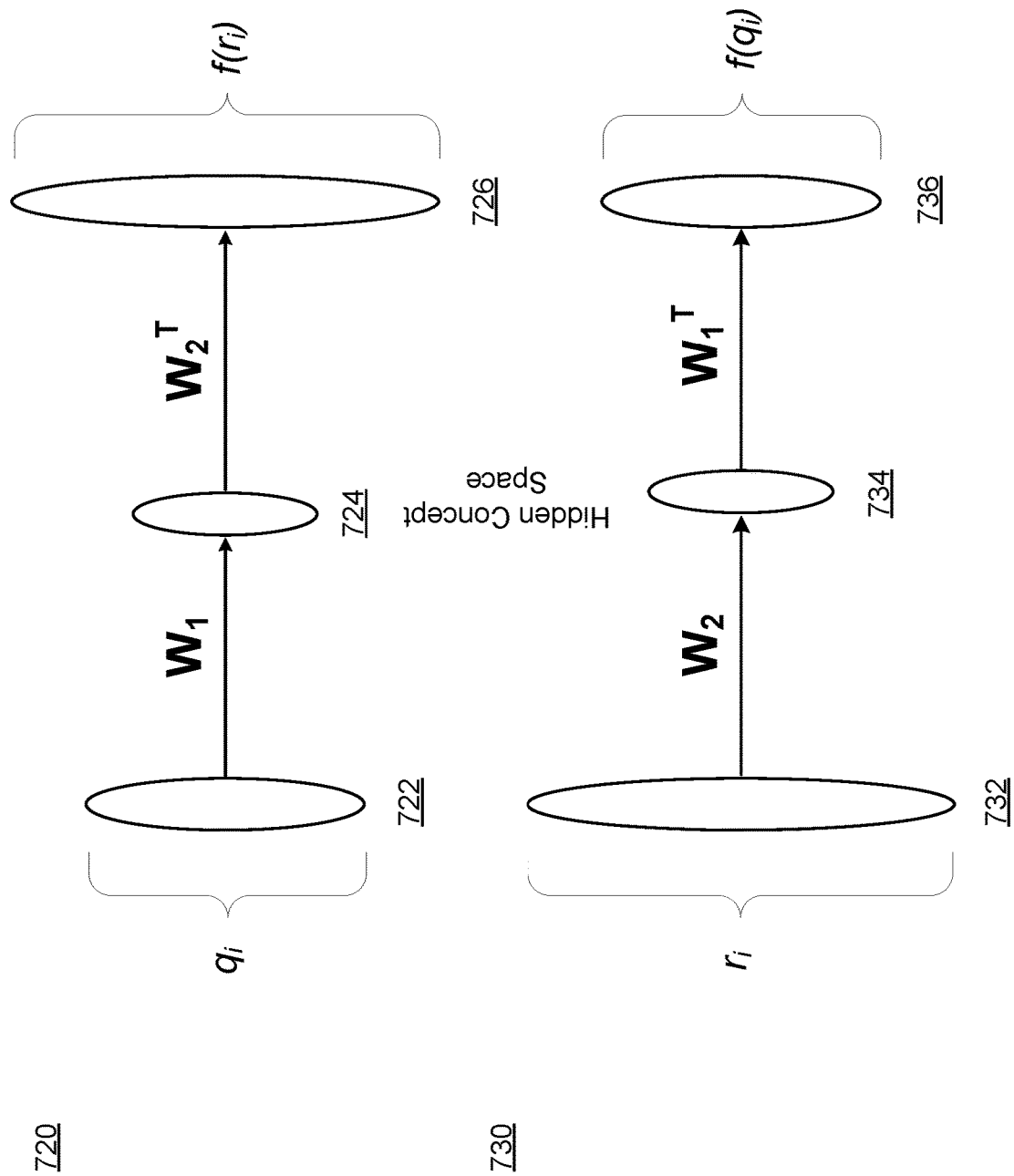
FIG. 7B illustrates an example training network architecture, in accordance with an embodiment.

FIG. 7B illustrates an example training network architecture, in accordance with an embodiment. As shown in FIG. 7B, the input layer 722 of the second training network 720 corresponds to queries, and the output layer 726 corresponds to records, with the hidden concept layer 724 placed in between the input layer 722 and the output layer 726. In reverse order, the input layer 732 of the second training network 730 corresponds to records, and the output layer 736 corresponds to queries, with the hidden concept layer 734 placed in between the input layer 732 and the output layer 736. Similarly to the example model 700 shown in FIG. 7A, the weights $W_1$, $W_2$, $W_1^T$, $W_2^T$ that connect nodes in the hidden concept space 724 and 734 respectively to the query input layer and the record output layer correspond to those in the example information retrieval model 200 shown in FIG. 2. The weights may be initialized with values determined from the first training step.

A first loss function associated with the network model 720, and a second loss function associated with the network model 730 is generated based on a set of query vectors and record vectors from the user interaction data 415. The first loss function is given by:

$$l_2(r_{ies_2}, f(q_{ies_2})),$$

and the second loss function is given by:

$$l_2(q_{ies_2}, f(r_{ies_2})),$$

where $q_i$ is the query vector, $r_i$ is the record vector from data instance i, and $S_2$ is the subset of encoded data used in the second training step. The output at layer 726 of the network model 720 is generated by:

$$f(q_i) = f_3(W_2^T \cdot f_2(W_1 \cdot q_i))$$

and the output at layer 736 of the network model 730 is generated by:

$$f(r_i) = f_5(W_1^T \cdot f_2(W_2 \cdot r_i))$$

where $f_2$ is the activation function at the hidden concept layer, $f_3$ is the activation function at the record layer, and $f_5$ is the activation function at the query layer in the architecture shown in FIG. 2.

In one embodiment, the training module 465 at each iteration, adjusts values of the weights based on a sum of the first loss and the second loss. In another embodiment, the training module 465, alternatively for each iteration, adjusts the values of weights based on the first loss or the second loss.

In the final training step, the training module 465 determines weight estimates using the actual architecture for the information retrieval model. The training module 465 determines weight estimates such that the loss function between a target vector associated with the last layer of the information retrieval model and an output generated based on a corresponding input at the first layer of the information retrieval model is minimized. When the information retrieval model has a cylindrical architecture, in which the input layer and the output layer correspond to the same type of data, the input vector acts as the target vector. In one embodiment, the initial values for the weights in the third training step are those determined through the second training step.

Figure 7C:
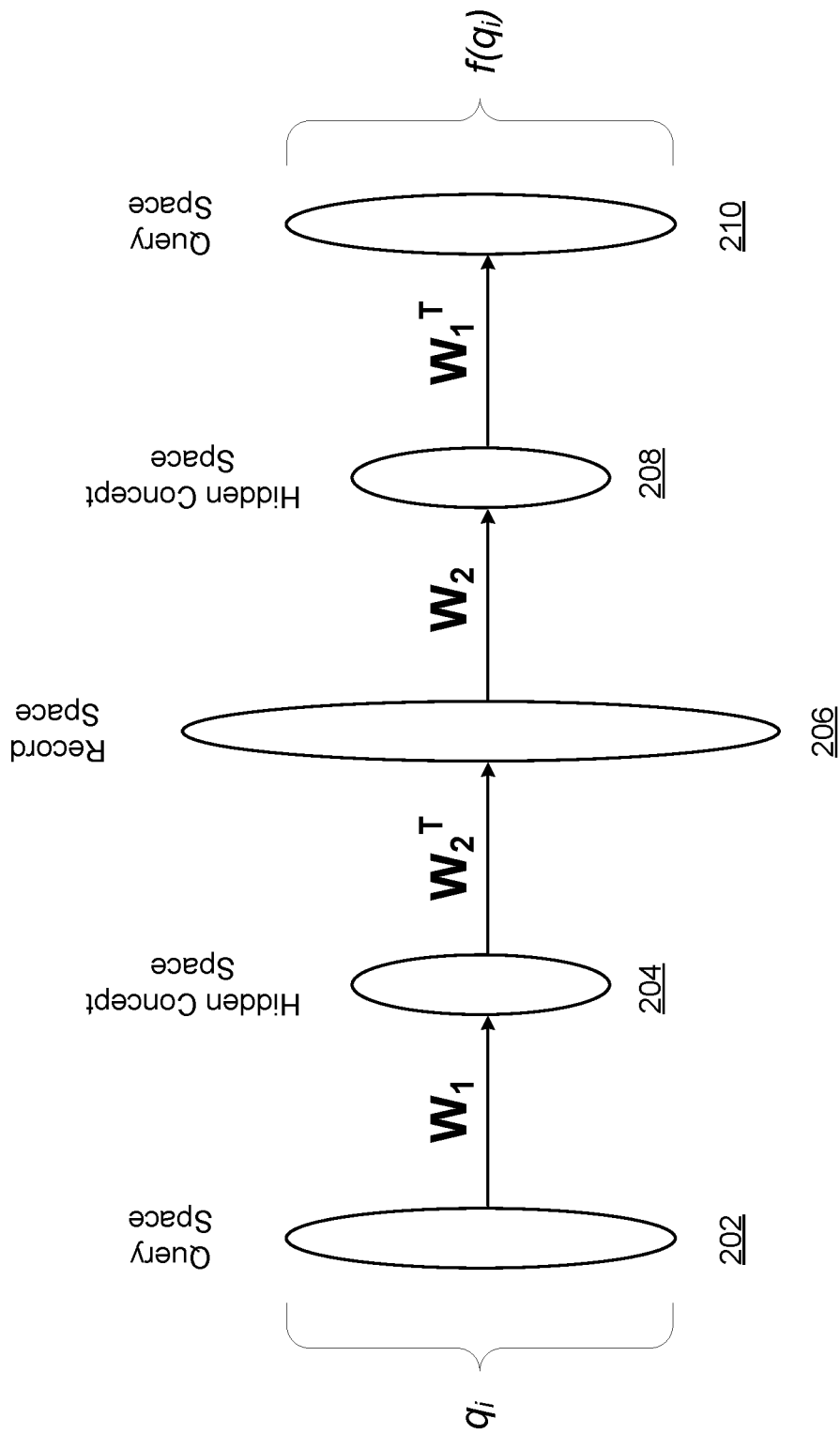
FIG. 7C replicates the example information retrieval model architecture of FIG. 2, in accordance with an embodiment.

FIG. 7C replicates the example information retrieval model 200 of FIG. 2, in accordance with an embodiment. The weights may be initialized to values determined from the second training step. The loss function is generated based on a set of query vectors from the user interaction data 415. The loss function is given by:

$$l_3(q_{ies_3}, f(q_{ies_3})),$$

where $q_i$ is the query vector from data instance i, and $S_3$ is the subset of encoded data used in the final training step. The output at layer 210 of the information retrieval model 200 is generated by:

$$f(q_i) = f_5(W_1^T \cdot f_2(W_2^T \cdot f_3(W_2^T \cdot f_2(W_1 \cdot q_i)))),$$

where $f_2$ is the activation function of the hidden concept layer, $f_3$ is the activation function of the record layer, and $f_5$ is the activation function of the query layer.

Figure 8:
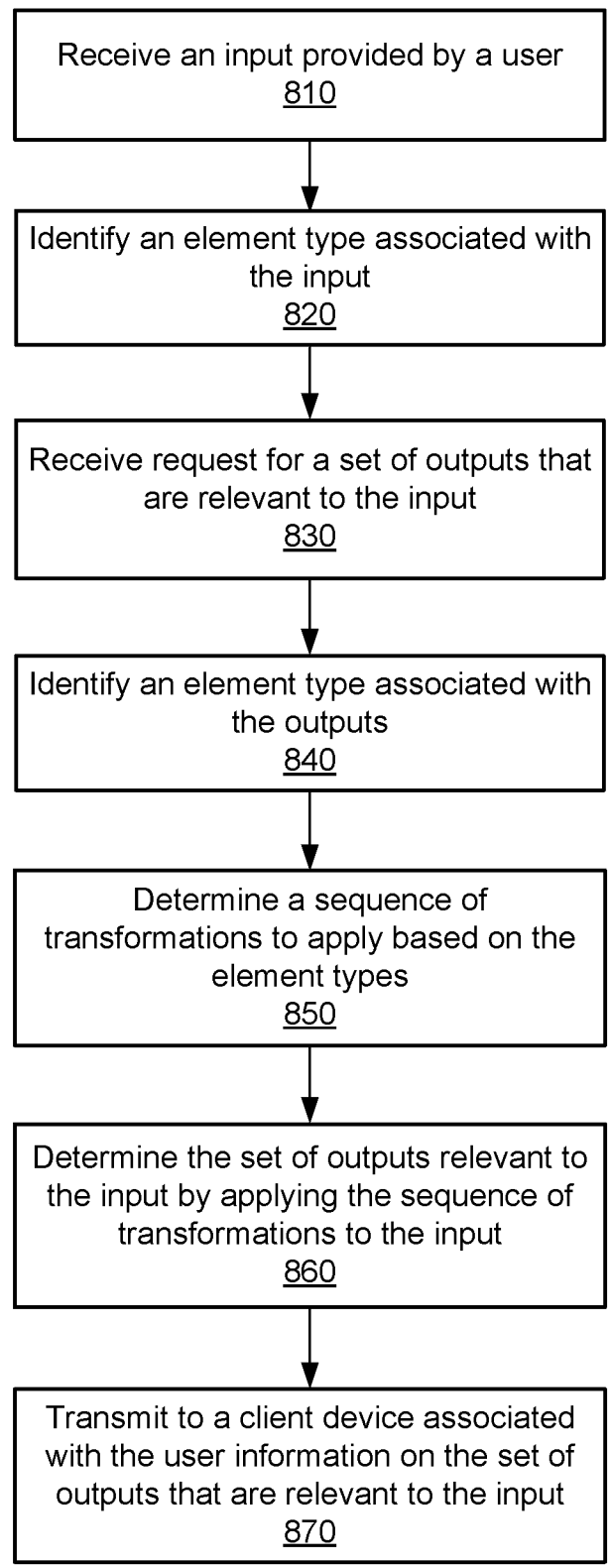
FIG. 8 is a flowchart illustrating a method of retrieving relevance information, in accordance with an embodiment.

FIG. 8 is a flowchart illustrating a method of retrieving relevance information, in accordance with an embodiment. The record management system 130 receives 810 an input provided by a user of the record management system 130. The record management system 130 identifies 820 an element type associated with the input. The record management system 130 also receives 830 a request for a set of outputs that are relevant to the input. The record management system 130 identifies 840 an element type associated with the requested set of outputs. For example, the input may be a search query and the user may request records, users, concepts or search queries relevant to the input search query. As another example, the input may be an identifier of a record stored by the record management system 130 and the user may request records, users, concepts or search queries relevant to the input record.

The record management system 130 determines 850 a sequence of transformations of a neural network model to apply based on the element type of the input and the element type of the set of outputs. Hence, the record management system 130 determines the transformation that need to be applied to get from the input to the desired output in the neural network model. The record management system 130 determines 860 the set of outputs relevant to the input by applying the sequence of transformations to the input. The record management system 130 transmits 870 information to a client device associated with the user that provided the input. The information indicates the determined set of outputs relevant to the input. For example, the information may be presented as search results to the input.

Those of skill in the art will recognize that other embodiments can perform the steps of FIG. 8 in different orders. Moreover, other embodiments can include different and/or additional steps than the ones described herein.

Figure 9:
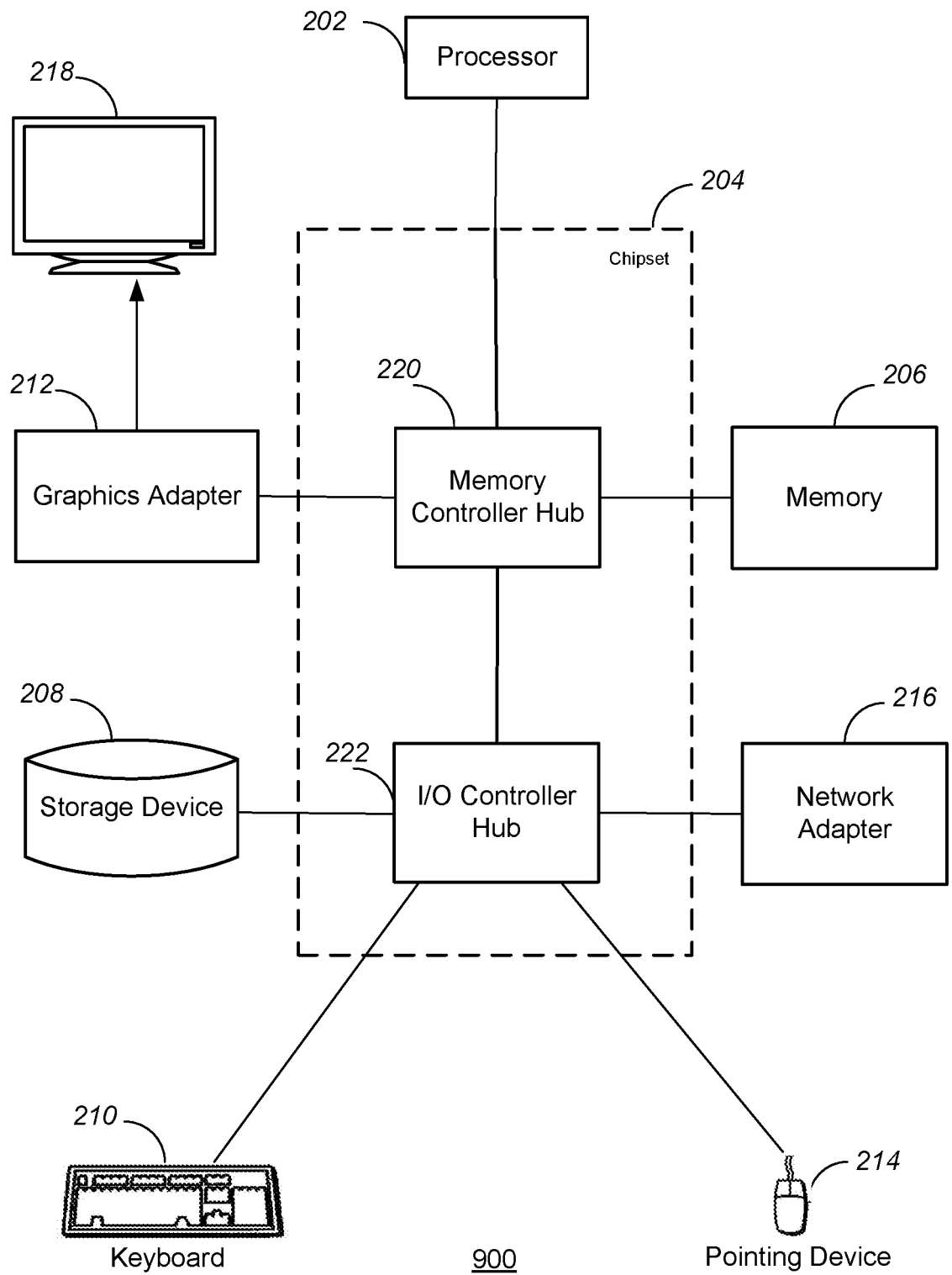
FIG. 9 is a high-level block diagram illustrating an example computer for implementing the client device and/or the record management system.

FIG. 9 is a high-level block diagram illustrating an example computer 900 for implementing the client device 110 and/or the record management system 130 of FIG. 3. The computer 900 includes at least one processor 902 coupled to a chipset 904. The chipset 904 includes a memory controller hub 920 and an input/output (I/O) controller hub 922. A memory 906 and a graphics adapter 912 are coupled to the memory controller hub 920, and a display 918 is coupled to the graphics adapter 912. A storage device 908, an input device 914, and network adapter 916 are coupled to the I/O controller hub 922. Other embodiments of the computer 900 have different architectures.

The storage device 908 is a non-transitory computer-readable storage medium such as a hard drive, compact disk read-only memory (CD-ROM), DVD, or a solid-state memory device. The memory 906 holds instructions and data used by the processor 902. The input interface 914 is a touch-screen interface, a mouse, track ball, or other type of pointing device, a keyboard, or some combination thereof, and is used to input data into the computer 900. In some embodiments, the computer 900 may be configured to receive input (e.g., commands) from the input interface 914 via gestures from the user. The graphics adapter 912 displays images and other information on the display 918. The network adapter 916 couples the computer 900 to one or more computer networks.

The computer 900 is adapted to execute computer program modules for providing functionality described herein. As used herein, the term "module" refers to computer program logic used to provide the specified functionality.

Thus, a module can be implemented in hardware, firmware, and/or software. In one embodiment, program modules are stored on the storage device 908, loaded into the memory 906, and executed by the processor 902.

The types of computers 900 used by the entities of FIG. 3 can vary depending upon the embodiment and the processing power required by the entity. The computers 900 can lack some of the components described above, such as graphics adapters 912, and displays 918. For example, the records management system 130 can be formed of multiple blade servers communicating through a network such as in a server farm.

We claim:

1. A computer implemented method, comprising:
    receiving an input provided by a user of a record management system;
    identifying an input element type associated with the received input among a plurality of element types;
    receiving a request for a set of outputs of a record management system that are relevant to the input;
    identifying an output element type associated with the set of outputs among the plurality of element types;
    selecting a sequence of transformations of an information retrieval model from a plurality of sequences of transformations, the sequence of transformations configured to determine the set of outputs of the identified output element type responsive to receiving the input of the identified input element type, wherein the sequence of transformations is trained to determine the set of outputs based on a relevance to the input, and wherein the information retrieval model was determined by:
        training a first neural network configured to receive an element of the input element type and output a first element of a first element type from the plurality of element types, the first element selected by the first neural network based on a relevance to the element of the input element type, and
        training a second neural network configured to output an element of the output element type, wherein the second neural network is further configured to receive an input determined based on the output of the first neural network, the element of the output element type selected by the second neural network based on a relevance to the input to the second neural network;
    determining the set of outputs that are relevant to the input by applying the sequence of transformations of the information retrieval model to the input; and
    transmitting to a client device associated with the user information on the set of outputs that are relevant to the input.

2. The computer implemented method of claim 1, wherein the plurality of element types includes at least two of: a search query, a record identification, and a user identification.

3. The computer implemented method of claim 1, wherein a first layer and a last layer of the information retrieval model have same a dimensionality and correspond to a same element type.

4. The computer implemented method of claim 1, wherein the sequence of transformations are transformations defined from a first set of nodes of the information retrieval model associated with the element type of the received input to a second set of nodes associated with the element type of the set of outputs.

5. The computer implemented method of claim 1, wherein a first transformation in the information retrieval model from a set of nodes associated with the first element type to a set of nodes associated with the second element type is characterized by multiplication of a matrix, and a second transformation in the information retrieval model from a set of nodes associated with the second element type to a set of nodes associated with the first element type is characterized by multiplication of a transpose of the matrix.

6. The computer implemented method of claim 1, wherein transformations of the information retrieval model are trained based on one or more neural network models having an architecture different from an architecture of the information retrieval model.

7. The computer implemented method of claim 1, wherein the element type of the input is a search query, and the method further comprising encoding the input as a word embedding vector.

8. The computer implemented method of claim 1, wherein the element type of the input is a record identification, and the method further comprising encoding the input as a one-hot encoded vector that includes a non-zero element corresponding to a record of the input, and zero otherwise.

9. The computer implemented method of claim 1, wherein the element type of the input is a user identification, and the method further comprising encoding the input as a one-hot encoded vector that includes a non-zero element corresponding to a user of the input, and zero otherwise.

10. The computer implemented method of claim 1, wherein the information retrieval model includes a first layer and a last layer of a first dimensionality and an additional layer between the first layer and the last layer of a second dimensionality higher than the first dimensionality.

11. A computer implemented method for training a neural network, the method comprising:
    determining a first set of transformations from a plurality of transformations and a second set of transformations from the plurality of transformations by training a first neural network configured to receive a first input and generate a first output, the first input and the first output each associated with a first element type and a second element type, the first output selected based on a relevance to the first input;
    adjusting the first set of transformations by training a second neural network configured to receive a second input based on the first output of the first neural network and generate a second output, the second input of the first element type and the second output of the second element type, the second output selected based on a relevance to the second input;
    adjusting the second set of transformations by training a third neural network configured to receive a third input based on the second output of the second neural network and generate a third output, the third input of the second element type and the third output of the first element type, the third output selected based on a relevance to the third input; and
    determining additional adjustments for the first set and the second set of transformations by training a fourth neural network configured to receive a fourth input based on the third output of the third neural network and associated with the first element type, transform the input to the second element type, and generate a fourth output associated with the first element type, the fourth output selected based on a relevance to the fourth input.

12. The method of claim 11, wherein the training of the second neural network begins with the determined first set of transformations from the first neural network.

13. The method of claim 11, wherein the training of the third neural network begins with the determined second set of transformations from the first neural network.

14. The method of claim 11, wherein the training of the fourth neural network begins with the adjusted first set and the adjusted second set of transformations.

15. The method of claim 11, wherein a transformation included in the first set of transformations is a matrix transpose of a transformation included in the second set of transformations.

16. A non-transitory computer-readable storage medium storing computer-executable instructions which when executed by a computer database system cause the computer database system to perform steps comprising:
 receiving an input provided by a user of a record management system;
 identifying an input element type associated with the received input among a plurality of element types;
 receiving a request for a set of outputs of a record management system that are relevant to the input;
 identifying an output element type associated with the set of outputs among the plurality of element types;
 selecting a sequence of transformations of an information retrieval model from a plurality of sequences of transformations, the sequence of transformations configured to determine the set of outputs of the identified output element type responsive to receiving the input of the identified input element type, wherein the sequence of transformations is trained to determine the set of outputs based on a relevance to the input, and wherein the information retrieval model was determined by:
  training a first neural network configured to receive an element of the input element type and output a first element of a first element type from the plurality of element types, the first element selected by the first neural network based on a relevance to the element of the input element type, and
  training a second neural network configured to output an element of the output element type, wherein the second neural network is further configured to receive an input determined based on the output of the first neural network, the element of the output element type selected by the second neural network based on a relevance to the input to the second neural network;
 determining the set of outputs that are relevant to the input by applying the sequence of transformations of the information retrieval model to the input; and
 transmitting to a client device associated with the user information on the set of outputs that are relevant to the input.

17. The computer-readable storage medium of claim 16, wherein the plurality of element types includes at least two of: a search query, a record identification, and a user identification.

18. The computer-readable storage medium of claim 16, wherein a first layer and a last layer of the information retrieval model have same dimensionality and correspond to a same element type.

19. The computer-readable storage medium of claim 16, wherein the sequence of transformations are transformations defined from a first set of nodes of the information retrieval model associated with the element type of the received input to a second set of nodes associated with the element type of the set of outputs.

20. The computer-readable storage medium of claim 16, wherein transformations of the information retrieval model are trained based on one or more neural network models having an architecture different from an architecture of the information retrieval model.

21. The computed implemented method of claim 1, wherein the element type of the input of the second neural network is the first element type.

22. The computer implemented method of claim 1, wherein the element type of the input of the second neural network is a different element type than the first element type.

23. A non-transitory computer-readable storage medium storing computer-executable instructions which when executed by a computer database system cause the computer database system to perform steps comprising:
 determining a first set of transformations from a plurality of transformations and a second set of transformations from a plurality of transformations by training a first neural network configured to receive a first input and generate a first output, the first input and the first output each associated with a first element type and a second element type, the first output selected based on a relevance to the first input;
 adjusting the first set of transformations by training a second neural network configured to receive a second input based on the first output of the first neural network and generate a second output, the second input of the first element type and the second output of the second element type, the second output selected based on a relevance to the second input;
 adjusting the second set of transformations by training a third neural network configured to receive a third input based on the second output of the second neural network and generate a third output, the third input of the second element type and the third output of the first element type, the third output selected based on a relevance to the third input; and
 determining additional adjustments for the first set and the second set of transformations by training a fourth neural network configured to receive a fourth input based on the third output of the third neural network and associated with first element type, transform the input to the second element type, and generate a fourth output associated with the first element type, the fourth output selected based on a relevance to the fourth input.

24. A computer-implemented system comprising:
 a computer processor; and
 a computer readable non-transitory storage medium storing instructions thereon, the instructions when executed by a processor cause the processor to perform the steps of:
  receiving an input provided by a user of a record management system;
  identifying an input element type associated with the received input among a plurality of element types;
  receiving a request for a set of outputs of a record management system that are relevant to the input;
  identifying an output element type associated with the set of outputs among the plurality of element types;
  selecting a sequence of transformations of an information retrieval model from a plurality of sequences of transformations, the sequence of transformations configured to determine the set of outputs of the identified output element type responsive to receiving the input of the identified input element type, wherein the sequence of transformations is trained to determine the set of outputs based on a relevance to the input, and wherein the information retrieval model was determined by:
training a first neural network configured to receive an element of the input element type and output a first element of a first element type from the plurality of element types, the first element selected by the first neural network based on a relevance to the element of the input element type, and
training a second neural network configured to output an element of the output element type, wherein the second neural network is further configured to receive an input determined based on the output of the first neural network, the element of the output element type selected by the second neural network based on a relevance to the input to the second neural network;
determining the set of outputs that are relevant to the input by applying the sequence of transformations of the information retrieval model to the input; and
transmitting to a client device associated with the user information on the set of outputs that are relevant to the input.

\* \* \* \* \*

UNITED STATES PATENT AND TRADEMARK OFFICE
CERTIFICATE OF CORRECTION

PATENT NO.           : 10,803,127 B2
APPLICATION NO.      : 15/601806
DATED                : October 13, 2020
INVENTOR(S)          : Zachary Alexander et al.

Page 1 of 1

It is certified that error appears in the above-identified patent and that said Letters Patent is hereby corrected as shown below:

In the Claims

Column 20, Line 4, Claim 21, delete "The computed implemented" and insert -- The computer implemented --.

Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*